Patented Feb. 7, 1939

2,146,178

UNITED STATES PATENT OFFICE 2,146,178

METHOD OF MAKING CANDY CREAMS

Jesse K. Farley, Jr., Evanston, Ill.

No Drawing. Application May 23, 1936,
Serial No. 81,507

4 Claims. (Cl. 99—134)

This invention relates to candy creams and the like and among other objects aims to improve the cream itself, as well as the method of making it.

The nature of the invention may be readily understood by reference to an illustrative embodiment of the invention hereinafter described.

The quality of a candy cream (aside from the purity of materials comprising it) is judged by the smoothness of its texture. The latter in turn depends upon the fineness of the crystals of sugar comprising the cream. Even though the sugar crystals cannot be separately distinguished by the eye, they may be, nevertheless, relatively so coarse as to make a harsh or hard cream. Heretofore, the making of creams or fondant has required not only careful portioning of materials, controlled temperatures, water content, etc., but has required boiling and vigorous and prolonged beating or stirring to limit the size of the sugar crystals. Without the exercise of such care, the cream or fondant would be harsh or granular and could not be used.

In the present invention, starch conversion sugar (i. e., dextrose) may be wholly substituted for cane sugar which has, heretofore, been deemed essential to a satisfactory fondant, despite the fact that it is undesirably sweet and tends to mask the flavor of chocolate or other fondant coating materials. While dextrose has been frequently employed in conjunction with cane sugar in making fondants, its use as a substitute for cane sugar has, heretofore, resulted in a hard or harsh cream. Any proposed improvement in the smoothness of such dextrose creams has involved such complicated and prolonged treatment as to defeat any advantages which otherwise might result from the use of dextrose.

According to the present invention, not only may dextrose be wholly substituted for cane sugar to provide a cream of superior quality, but the latter may be made without boiling or beating by a greatly simplified process. Pure crystalline dextrose and water are mixed together, heated and stirred so as to facilitate solution. For this purpose, it is unnecessary to heat above 180° F. The heating is preferably not carried high enough to result in substantial loss of water. After a clear solution results, the latter is cooled to about 100° F. The water content of the solution should preferably be between 15 and 30%, depending on the desired final consistency of the cream; and if in excess of the desired amount, the excess water must be boiled away or other appropriate correction must be made. When the temperature falls below 120° F. and preferably about 115° F., the solution is seeded with a quantity of cream from a previous batch comprising the characteristic fragile crystals which appear under the microscope to comprise mainly needle-like dextrose hydrate crystals which are microscopic in size. Preferably an inhibitor such as corn syrup is added to hold the crystals to minimum size. The inhibitor may advantageously be added to the solution so as to facilitate its cooling.

While there are three known forms of dextrose hydrate crystals, the fine needle-like crystals and possibly some other minute and fragile crystals seem to form more readily and under a greater variety of conditions than the larger types of crystals. Even when cultivated under the most favorable conditions, the needle-like crystals do not exceed microscopic size, but in the presence of an inhibitor, such as corn syrup, the crystals are extremely fine and even under the microscope appear fragile and hair-like. Crystals of this minute and fragile character form naturally and particularly readily in the uncontrolled crystallization which takes place at an intermediate stage in the recovery of dextrose. From the standpoint of manufacture of purified dextrose, such crystalline structure is undesirable, since it is impossible completely to purge the dextrose of the mother liquor or hydrol which thereby gives the dextrose a slightly bitter taste and renders it unsuitable for use in candies and the like, although it has many other uses. It is generally pressed in a filter to remove as much as possible of the hydrol or mother liquor, and has, heretofore, been sold as commercial corn sugar. Its purity is about 70% or 80%.

To produce a dextrose of high purity wholly free from hydrol, it has been necessary to control the crystallization of the dextrose in the mother liquor in such a way as to produce large crystals (and particularly to prevent the formation of the minute, fragile crystals) and thereby make it possible to purge the crystals in the centrifugals by washing out the mother liquor or hydrol. The resulting dextrose, while of exceedingly high purity, comprises crystals which are large and coarse, at least as regards their suitability for fondant or creams. Such crystals are monoclinic or rhombic in character, depending upon whether the dextrose is a dextrose hydrate or anhydrous dextrose. The rhombic and monoclinic crystals are sufficiently large to insure a pervious layer in the centrifugals which allows the mother liquor and the subsequent wash water to pass through the layer and completely to purge the dextrose. They are not fragile, being strong enough to maintain the pervious condition of the layer under the forces to which they are subjected in the centrifugals and to withstand handling in delivery to the centrifugals. The minute, fragile crystals are apparently not simply smaller forms of the aforesaid large crystals but are entirely different in character and are both so small and so fragile as to produce an impervious layer in the centrifugals which cannot be purged of the mother liquor. These crystals should not be confused with the rhombic anhydrous dextrose crystals, which though elongated and appearing to the eye to be small, are relatively of large size compared to the aforesaid needle-like hydrate crystals.

In making the present cream, formation of the needle-like crystals is encouraged. These are naturally extremely minute but under the inhibiting influence of the corn syrup, develop only to minimum size, in which condition they are so fragile and filament-like that they break up on the least disturbance. The formation of the larger dextrose hydrate and anhydrous dextrose crystals is practically prevented not only by the aforesaid seeding, but by employing concentrations and temperatures unfavorable to the formation of the latter crystals. Seeding at a definite temperature is not essential, but it is preferable to seed at temperatures (such as 110° to 115° F.) which will very slightly melt the seeding material, so as to facilitate its separation and dispersion through the solution. Higher temperatures than this should be avoided to prevent complete or excessive melting of the seeding crystals.

To make the initial batch, it is satisfactory to use a quantity of commercial corn sugar which has a purity of from 70% to 80%. Such sugar comprises largely the fine needle-like crystals, since it has not been refined, as explained above, by selective crystallization under carefully controlled temperatures and water content and thereafter centrifuged. It is prepared simply by removing as much as possible of the mother liquor or hydrol in a filter press. Except that it would require prolonged stirring, the fine needle-like crystals will spontaneously form without the aid of seeding material. On subsequent batches, material from the previous batch is employed for seeding.

Under the aforesaid conditions, the fine needle-like crystals form quickly. It is not essential that crystallization be complete before molding or otherwise forming cream centers and the like, since only fine crystals can develop. Indeed the batch may be deposited any time after seeding without impairing the smoothness of the cream. Preferably it is cooled to about 90° F. before depositing, at which temperature the cream is still sufficiently soft to run into molds or into containers. No boiling or prolonged beating, such as characterizes the making of cane sugar fondants is required, nor is remelting with a bob necessary, as in the present practice. In containers, the cream is sufficiently protected either to be stored or to be sold as an article of commerce for confectionery and other purposes for which its smooth consistency commends it.

As one example, the following method will serve to illustrate the practice of the invention:

One hundred and fifty pounds (or any multiple thereof) of crystalline dextrose is melted in a kettle with fifty pounds of water. It is unnecessary to carry the temperature above 180° F. for this purpose. When a clear solution results, one hundred pounds of corn syrup is added as an inhibitor. Addition at this time advantageously aids in reducing the temperature of the solution. The corn syrup may be about 43° Bé., but this density is not essential. The amount of added water should be adjusted to the density of the corn syrup. The order of adding the materials is not essential. The prepared solution should have a water content from 15% to 30%, depending upon the desired consistency of the fondant.

The kettle should preferably have coils or other heat exchange means by which the contents may be heated and thereafter cooled. The mixture is heated and stirred until a clear solution results, it being preferable not to prolong the heating nor to carry the temperatures high enough to result in the evaporation of any substantial amount of water. On the other hand, if the batch contains excess water, it should be boiled down to the desired water content.

After preparation of a solution of the proper water content, it is cooled in the kettle to a temperature of about 115° F. or below and seeded with cream from a previous batch as aforesaid. The seeding fondant may be about one per cent of the batch.

Stirring is preferably continued until the batch is deposited or packaged. Before depositing, flavoring and coloring may be added. Albumen, gelatin or other colloidal material may also be added at this time if it be desired further to lighten the cream. The addition of these materials is, of course, optional. Thereafter, the cream is cast in molds or otherwise formed and when so cast or formed may be coated with chocolate or other coating in the usual way.

Obviously the invention is not limited to the details of the illustrative method, since these may be variously modified. Moreover, it is not indispensable that all features of the invention be used conjointly, since these may be used to advantage in different combinations and sub-combinations.

Having described my invention, I claim:

1. The method of making candy creams and the like which comprises preparing without substantially boiling a heated supersaturated solution containing from 15% to 30% of water of purified commercial dextrose comprising substantially large purgeable crystals, cooling the solution below 120° F. and seeding the solution with a small quantity of non-purgeable fine needle-like dextrose hydrate crystals, adding a quantity of cool corn syrup as a crystallization inhibitor and to facilitate further cooling, promoting without beating and in the absence of sucrose the formation of fine non-purgeable needle-like hydrate crystals throughout the solution, then after crystals have started to form and while still in fluid condition directly depositing the preparation in molds or the like, and completing the solidification of the cream in the molds.

2. The method of making confectionery and the like which comprises preparing a supersaturated solution in water of purified dextrose in the absence of sucrose, seeding the solution with minute, fragile dextrose crystals of the character which occur in commercial, impure dextrose, gently stirring the solution without beating until there is a partial development of the aforesaid minute, fragile crystals, and then directly depositing the partially crystallized solution in molds while it is in liquid condition and allowing the crystallization to progress in the molds.

3. The method of making candy creams and the like which comprises preparing a supersaturated solution of purified commercial dextrose comprising relatively large crystals together with corn syrup as a crystallization inhibitor, seeding the solution with minute non-purgeable dextrose hydrate crystals, promoting the growth of fragile non-purgeable needle-like dextrose hydrate crystals without beating and in the absence of sucrose, and then after crystal formation has started but while the preparation is still in fluid condition directly depositing the same in molds and completing the formation of said crystals in the mold to solidify the cream.

4. The method of making candy creams and the like which comprises preparing a supersaturated solution of dextrose together with corn syrup as a crystallization retarder, maintaining the solution in condition to promote the growth of fragile needle-like non-purgeable dextrose hydrate crystals in the solution without beating, and then while the preparation is still in fluid condition directly depositing the same in molds and completing the formation of said crystals in the mold.

JESSE K. FARLEY, Jr.